(12) United States Patent
Fu et al.

(10) Patent No.: US 12,091,114 B2
(45) Date of Patent: Sep. 17, 2024

(54) SELF-LEARNING COLLABORATIVE CONTROL METHOD FOR ACTIVE STEERING AND YAW MOMENT

(71) Applicant: Zhengzhou University of Light Industry, Henan (CN)

(72) Inventors: Zhijun Fu, Henan (CN); Yaohua Guo, Henan (CN); Dengfeng Zhao, Henan (CN); Jinquan Ding, Henan (CN); Chaohui Liu, Henan (CN); Wenbin He, Henan (CN); Wenchao Yang, Henan (CN); Lei Yao, Henan (CN); Fang Zhou, Henan (CN); Hui Wang, Henan (CN); Wuyi Ming, Henan (CN)

(73) Assignee: Zhengzhou University of Light Industry, Zhengzhou (CN)

( * ) Notice: Subject to any disclaimer, the term of this patent is extended or adjusted under 35 U.S.C. 154(b) by 0 days.

(21) Appl. No.: 18/395,716

(22) Filed: Dec. 25, 2023

(65) Prior Publication Data

US 2024/0132152 A1   Apr. 25, 2024

Related U.S. Application Data

(63) Continuation of application No. PCT/CN2022/138265, filed on Dec. 11, 2022.

(30) Foreign Application Priority Data

Jan. 18, 2022   (CN) .......................... 202210052344.1

(51) Int. Cl.
*B62D 7/15*   (2006.01)

(52) U.S. Cl.
CPC .................................. *B62D 7/159* (2013.01)

(58) Field of Classification Search
CPC ....... B62D 7/159; B60W 10/18; B60W 10/20; B60W 30/02; B60W 50/00; Y02T 10/72
See application file for complete search history.

(56) References Cited

U.S. PATENT DOCUMENTS

| 2023/0131835 | A1* | 4/2023 | Hwang | ............... | B60W 60/001 |
|---|---|---|---|---|---|
|  |  |  |  |  | 701/22 |
| 2023/0211772 | A1* | 7/2023 | Suh | ........................ | B60N 2/002 |
|  |  |  |  |  | 701/41 |
| 2023/0311849 | A1* | 10/2023 | Raste | .................... | B60W 10/04 |
|  |  |  |  |  | 701/22 |

FOREIGN PATENT DOCUMENTS

| AU | 2020102015 A4 * | 10/2020 | ............ B60W 30/02 |
|---|---|---|---|
| CN | 106184363 B * | 10/2018 | ............... B62D 6/00 |

OTHER PUBLICATIONS

English translation of Li et al. (AU 2020102015) (Year: 2020).*
English translation of Yuan et al. (CN 106184363) (Year: 2018).*

* cited by examiner

*Primary Examiner* — James M McPherson
*Assistant Examiner* — Kyle J Kingsland

(57) ABSTRACT

The present disclosure provides a self-learning collaborative control method for active steering and yaw moment for a motor vehicle, including a first step of constructing fundamental formulas which are stored in a vehicle ECU, and a second step of calculating an active steering angle $\delta_C$ and a yaw moment $M_c$ on line by the vehicle ECU according to following sub-steps during a driving process of the motor vehicle, and controlling a driving state of the motor vehicle according to $\delta_C$ and $M_c$. The second step includes a first sub-step of collecting raw real-time parameter values, a second sub-step of performing calculation by the identifier and the control target reference model, a third sub-step of calculating $\delta_C$ and $M_c$. The present disclosure can realize the self-learning collaborative control of active steering and yaw moment without requiring a system control model and correct a driver's steering operation.

4 Claims, 3 Drawing Sheets

SELF-LEARNING COLLABORATIVE CONTROL METHOD FOR ACTIVE STEERING AND YAW MOMENT

CROSS-REFERENCE TO RELATED APPLICATIONS

The present application is a Continuation Application of PCT Application No. PCT/CN2022/138265, filed on Dec. 11, 2022, which claims the priority of Chinese Invention Application No. 202210052344.1, filed on Jan. 18, 2022, the entire contents of which are hereby incorporated by reference.

TECHNICAL FIELD

The present disclosure relates to the fields of automatic control, information technology, and advanced manufacturing, and more particularly, to a collaborative control of active steering and yaw moment with unknown•models.

DESCRIPTION OF THE PRIOR ART

Advanced active chassis control systems play a key role in achieving better handling and stability, as well as safer cars. In practical applications, the chassis systems need to have higher intelligence to adapt to various road conditions.

An active steering control system can apply additional steering angles to steering commands from a driver and directly affect lateral dynamic behaviors of a motor vehicle by adjusting a lateral force of a tire of the motor vehicle.

However, when the tire enters a nonlinear region, the active steering control system cannot generate sufficient tire lateral force, and the performance of the active steering control system in a linear maneuvering region is therefore limited. A yaw moment control system is very effective for vehicle stability in both the linear and nonlinear maneuvering regions. The yaw moment control system generates an appropriate amount of corrective yaw moment through differential braking on left and right sides of the motor vehicle to maintain the vehicle stability.

However, due to significant deceleration of the motor vehicle caused by tire wear and braking, the yaw moment control system is only suitable for limited maneuvering. A separate active steering control system and a separate yaw moment control system cannot achieve comprehensive optimal safety performance. Therefore, it is necessary to integrate the active steering control system and the yaw moment control system to achieve a desired yaw rate and a desired slip angle through collaborative control between the active steering control system and the yaw moment control system, and thus to obtain satisfactory vehicle driving stability performance under different driving actions.

The model uncertainty caused by parameters such as a tire cornering stiffness, a longitudinal vehicle speed, and tire nonlinear characteristics bring significant challenges to the design of a controller. The existing commonly-used control method is based on linear quadratic regulator (LQR), which has the major drawback that the optimal control of the chassis can be realized after the suspension system model is accurately obtained. In addition, feedback control gains are obtained offline by solving the Riccati Formula. After the feedback gains of the controller are obtained, the feedback gains cannot be changed with different road external inputs and related vehicle uncertainty parameters. Therefore, a more effective control strategy is required to adaptively handle intelligent chassis control problems in real time under different driving conditions in which parameters change over time.

SUMMARY OF THE DISCLOSURE

The purpose of the present disclosure is to provide a self-learning collaborative control method for active steering and yaw moment, which does not require prior knowledge of a suspension system model, and is capable of solving the problem that model uncertainty brings significant challenges to a design of a controller and realizing control only based on data from sensors; the present disclosure is used to adaptively handle intelligent chassis control problems in real time under different driving conditions in which parameters change over time.

In a first aspect of the present disclosure, a self-learning collaborative control method for active steering and yaw moment for a motor vehicle is provided; the motor vehicle has a vehicle ECU connected to a vehicle speed sensor for acquiring a vehicle speed $v_x$, a steering angle sensor for acquiring a steering angle $\delta_f$ of a driver, a yaw rate sensor for acquiring a yaw rate $\gamma$, and a center of mass slip angle sensor for acquiring a center of mass slip angle $\beta$;

each sensor is conventionally arranged, wherein the steering angle sensor is arranged on a steering shaft of a steering wheel of the motor vehicle, and the yaw rate sensor and the center of mass slip angle sensor are arranged on the center of mass of the motor vehicle;

a constant $K_1$ representing an identification gain, a constant $\Gamma$ representing an online learning gain, time constants $\tau_r$ and $\tau_\beta$, a vehicle mass m, a distance $l_f$ from the center of mass to a front axle, a distance $l_r$ from the center of mass to a rear axle, and a constant $K_2$ representing a control gain are stored in the vehicle ECU;

wherein the method includes:

a first step, constructing fundamental formulas which are stored in the vehicle ECU, including an identifier, a control target reference model, and a controller, wherein the fundamental formulas includes Formulas 1 to 15;

the first step includes a first sub-step of constructing Formula 1 and Formula 2, and Formula 1 is a parameterized neural network: $\dot{x}=-ax+\omega\sigma(x)+\lambda u$; wherein $x=[\beta,\gamma]^T \in R^2$ is a 2-dimensional column vector in a real number field R, $\beta$ is the center of mass slip angle in rad, $\gamma$ is the yaw rate in rad/s, $a \in R^{2\times2}$ is a 2-by-2 matrix in the real number field R, $\omega \in R^{2\times2}$ is a 2-by-2 matrix in the real number field R, $\sigma(x)$ is a sigmoidal activation function in the neural network and $\sigma(x)=[\sigma(x_1), \sigma(x_2)]^T$, $\lambda \in R^{2\times2}$ is a 2-by-2 matrix in the real number field R, $u=[\delta_c, M_c]^T \in R^2$ is a 2-dimensional column vector in the real number field R; $\delta_C$ is an active steering angle in rad; $M_c$ is a yaw moment in N·m; and $\delta_C$ and $M_c$ are final calculation results used to control the motor vehicle;

Formula 2 is obtained by rewriting Formula 1: $\dot{x}=\theta^T\psi$, wherein $\theta=[a, w, \lambda]^T$, $\psi=[x, \sigma(x), u]^T$;

the first step includes a second sub-step of designing the identifier and an online self-learning rate, and constructing Formula 3 and Formula 4;

Formula 3 is the identifier used to implement a system identification: $\dot{\hat{x}}=\hat{\theta}^T\psi+K_1 e_1$; wherein $e_1=x-\hat{x}$ represents an identification error, $\hat{x}$ represents an identification state, $\hat{\theta}=[\hat{a}, \hat{w}, \hat{\lambda}]^T$ represents an identification parameter, $K_1 > 0$ is a constant obtained by trial and error and stored in the vehicle ECU, representing the identification gain; $\dot{\hat{\theta}}$ is an identification result of Formula 3 and is provided to Formula 7;

Formula 4 is the online self-learning rate: $\dot{\hat{\theta}} = \Gamma \psi e_1$; wherein $\Gamma$ is a constant obtained by trial and error and is stored in the vehicle ECU, $\Gamma > 0$, and $\Gamma$ represents the online learning gain;

the first step includes a third sub-step of constructing the control target reference model expressed by Formula 5 to generate a target tracking signal;

Formula 5 is: $\dot{x}_r = A_r x_r + E_r \delta_f$; wherein $x_r$ is a reference state, and $x_r = [\beta_r, \gamma_r]^T$, $\beta_r$ is a target center of mass slip angle, $\gamma_r$ is a target yaw rate, and $\beta_r$ and $\gamma_r$ are calculation results of Formula 5 and serve as the target tracking signals;

$$A_r = \begin{bmatrix} -\dfrac{1}{\tau_\beta} & 0 \\ 0 & -\dfrac{1}{\tau_r} \end{bmatrix},$$

wherein:

$$\tau_\beta = \dfrac{a_{12}a_{21} - a_{11}a_{22}}{a_{12}(a_{21}f_1 - a_{11}f_2)}, \tau_\gamma = \dfrac{a_{12}a_{21} - a_{11}a_{22}}{a_{22}(a_{21}f_1 - a_{11}f_2)} \cdot k_\gamma,$$

$$k_\gamma = \dfrac{a_{21}f_1 - a_{11}f_2}{a_{11}a_{22} - a_{12}a_{21}}, a_{11} = \dfrac{C_f + C_r}{mv_x},$$

$$a_{12} = \dfrac{C_f l_f - C_r l_r}{mv_x^2} - 1, a_{21} = \dfrac{C_f l_f - C_r l_r}{I_z},$$

$$a_{22} = \dfrac{C_f l_f^2 + C_r l_r^2}{I_z v_x}, f_1 = -\dfrac{C_f}{mv_x}, f_2 = -\dfrac{C_f l_f}{I_z};$$

$I_Z$ is a vertical rotational inertia of the motor vehicle in kg·m², which is determined by a vehicle manufacturer and stored in the vehicle ECU;

$$E_r = \begin{bmatrix} \dfrac{1 - \dfrac{ml_f}{2(l_f + l_r)l_r c_r} v_x^2}{1 + \dfrac{m}{(l_f + l_r)}\left(\dfrac{l_f}{2c_r} - \dfrac{l_r}{2c_f}\right)v_x^2} \times \dfrac{l_r}{(l_f + l_r)} \\ \dfrac{\dfrac{v_x}{l_f + l_r}}{1 + \dfrac{m}{(l_f + l_r)}\left(\dfrac{l_f}{2c_r} - \dfrac{l_r}{2c_f}\right)v_x^2} \end{bmatrix}$$

m is the vehicle mass in kg; $l_f$ is the distance from the center of mass to the front axle in meters; $l_r$ is the distance from the center of mass to the rear axle in meters, $v_x$ is the vehicle speed obtained by the vehicle speed sensor in m/s; $C_f$ is a front wheel cornering stiffness in N/rad; $C_r$ is a rear wheel cornering stiffness in N/rad;

the first step includes a fourth sub-step of constructing the controller expressed by Formula 6 based on an approximate dynamic programming theory to achieve a self-learning collaborative control for active steering and yaw moment:

Formula 6 is the controller: $u = u_1 + u_2$; wherein $u_1$ is configured to ensure that a controlled steady-state error converges to zero, and $u_1$ is expressed by Formula 7: $u_1 = \lambda^\oplus[(\dot{x} - ax - w\sigma(x)) - K_2 e_2]$; wherein $\lambda^\oplus$ represents a generalized inverse of $\lambda$, $$e_2 = x - x_r = \begin{bmatrix} \beta - \beta_r \\ \gamma - \gamma_r \end{bmatrix} = \begin{bmatrix} e_\beta \\ e_\gamma \end{bmatrix}$$

represents a tracking error, $x_r$ is obtained from Formula 5, $K_2$ is obtained by trial and error and is stored as the constant representing the control gain in the vehicle ECU, and $K_2 > 0$;

Formula 6 is configured to ensure an optimal control performance based on the approximate dynamic programming theory, and is obtained through Formulas 8 to 15;

Formula 8 is an evaluation function V:

$$V(e_2) = \min_{u_2} \int_0^\infty \left[e_2^T(\tau) Q e_2(\tau) + u_2^T(\tau) P u_2(\tau)\right] d\tau;$$

wherein $Q \in R^{2 \times 2}$ is a 2-by-2 diagonal matrix in the real number field R representing a weight for optimizing and controlling the tracking error $e_2$ in the evaluation function, which is obtained through trial and error and is stored in the vehicle ECU; $P \in R^{2 \times 2}$ is a 2-by-2 diagonal matrix in the real number field R representing a weight for optimizing and controlling $u_2$ in the evaluation function, which is obtained through trial and error and is stored in the vehicle ECU;

Formula 9 is a Hamiltonian function: $H(e_2, u_2, \nabla V(e_2)) = (\nabla V(e_2))^T(-K_2 e_2 + \hat{\lambda} u_2) + e_2^T Q e_2 + u_2^T P u_2$; wherein $$\nabla V(e_2) = \dfrac{\partial V(e_2)}{e_2}$$

represents a partial derivative of V with respect to $e_2$, and an optimal evaluation function V is approximated with the neural network in Formula 10;

Formula 10 is: $V(e_2) = W_v^T \sigma(e_2)$; wherein $W_v$ is an ideal weight vector, and $\sigma(e_2)$ is the sigmoidal activation function in the neural network;

Formula 11 is derived from Formula 10:

$$\nabla V(e_2) = \dfrac{\partial V(e_2)}{e_2} = (\nabla \sigma(e_2))^T W_V + \nabla \varepsilon;$$

a Hamiltonian function, that is, Formula 12 is obtained by substituting Formula 11 into Formula 9: $H(e_2, u_2, \nabla V(e_2)) = W_V^T \nabla \sigma(e_2)(-K_2 e_2 + \hat{\lambda} u_2) + e_2^T Q e_2 + u_2^T P u_2$;

Formula 13 is obtained by making a left side of Formula (12) equal to zero: $M = W_V^T N$; wherein $M = -e_2^T Q e_2 - u_2^T P u_2$, and $N = \nabla \sigma(e_2)(-K_2 e_2 + \hat{\lambda} u_2)$;

Formula 14 is obtained through a principle of least squares method: $W_v = (N^T N)^{-1} N^T M$; and Formula 15 is obtained by solving Formula (12): $u_2 = -\tfrac{1}{2} P^{-1} \hat{\lambda}^T (\nabla \sigma(e_2))^T W_v$; and a second step, during a driving process of the motor vehicle, calculating values of the active steering angle $\delta_C$ and the yaw moment $M_c$ online by the vehicle ECU according to the following sub-steps, and controlling an operating state of the motor vehicle according to the calculation results of $\delta_C$ and $M_c$.

In some embodiments, the method includes a first sub-step of collecting raw real-time parameter values, including a value of the steering angle $\delta_f$ measured by the steering angle sensor when the driver is steering the wheel, a value of the vehicle speed $v_x$ from the vehicle speed sensor, a value of the center of mass slip angle β from the center of mass slip angle sensor, and a value of the yaw rate γ from the yaw rate sensor.

In some embodiments, the second step includes a second sub-step of performing calculation by the identifier and the control target reference model, including:

providing the value of the center of mass slip angle β and the value of the yaw rate γ to the identifier expressed by Formula 3 by the vehicle ECU, and performing a calculation to obtain $\hat{\theta}$ as a basis for calculating a value of $u_1$ in Formula 6;

providing $\hat{\theta}$ to Formula 7 to calculate the value of $u_1$ required by Formula 6; and providing the value of the steering angle $\delta_f$ and the value of the vehicle speed $v_x$ to the control target reference model expressed by Formula 5 by the vehicle ECU, and performing a calculation to obtain a value of the target center of mass slip angle $\beta_r$ and a value of the target yaw rate $\gamma_r$ as basis for calculating $e_2$ required for $u_1$ and $u_2$ in Formula 6.

In some embodiment, the second step includes a third sub-step of providing $\beta_r$, $\gamma_r$ and $\hat{\theta}$ to the controller expressed by Formula 6 by the vehicle ECU, and performing a calculation to obtain the active steering angle $\delta_C$ and the yaw moment $M_c$ through Formulas 6 to 15;

controlling, by the vehicle ECU, a rotation of a steering wheel of the motor vehicle according to the active steering angle $\delta_C$ obtained in real time, and controlling a braking action of a baker of the motor vehicle according to the yaw moment $M_c$ obtained in real time;

repeating the second step to achieve an online model-free self-learning collaborative control for active steering and yaw moment.

The present disclosure has the following advantages:

The present disclosure is capable of adaptively handle intelligent chassis control problems with parameters changing over time under different driving conditions in real time, which can get rid of the constraint that the optimal control of the chassis can be realized only after the suspension system model is accurately obtained.

In the present disclosure, the vehicle ECU can achieve self-learning collaborative control of active steering and yaw moment without requiring a system control model, calculate the ideal active steering angle $\delta_C$ and the ideal yaw moment $M_c$, adjust and control braking and steering of the vehicle, correct the driver's steering operation, overcome the improper driving behavior of the driver, and allow for a neutral steering when the vehicle turns around. After the vehicle ECU controls the steering action of the vehicle according to the active steering angle $\delta_C$ and the yaw moment $M_c$, the actual center of mass slip angle $\beta_r$ and the yaw rate $\gamma_r$ feedback from the vehicle approach the values calculated by Formula 5, avoiding accidents such as instability caused by improper driving.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
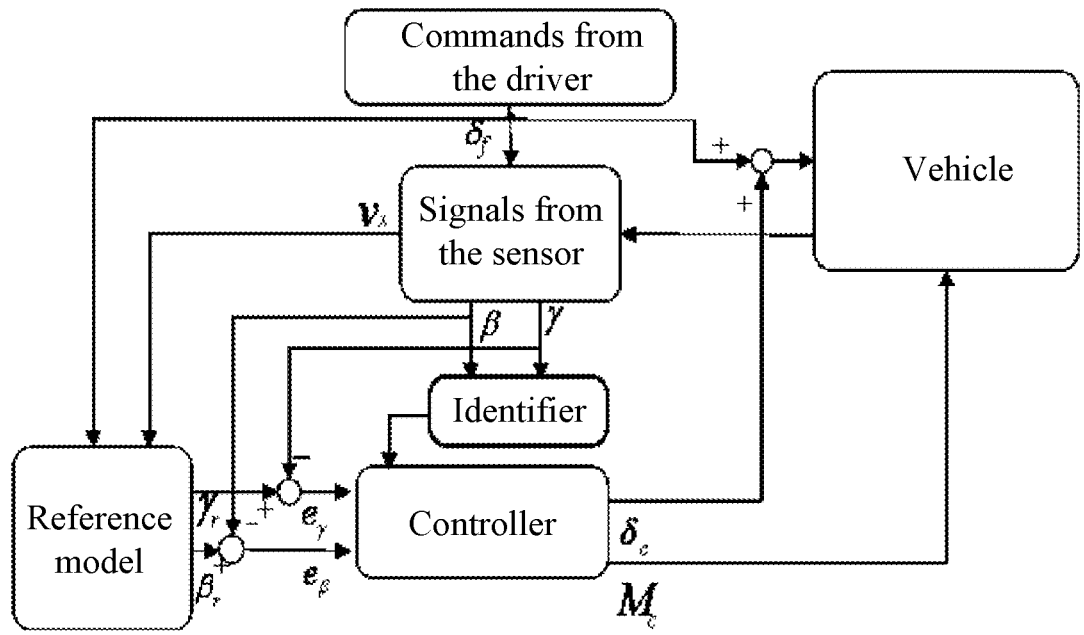
FIG. 1 is a schematic diagram showing a principle of the present disclosure.

As shown in FIG. 1, s self-learning collaborative control method for active steering and yaw moment is provided in the present disclosure for a motor vehicle, which has a vehicle ECU connected to a vehicle speed sensor for acquiring a vehicle speed $v_x$, a steering angle sensor for acquiring a driver steering angle $\delta_f$, a yaw rate sensor for acquiring a yaw rate γ, and a center of mass slip angle sensor for acquiring a center of mass slip angle β.

Each sensor is conventionally arranged, for example, the steering angle sensor is arranged on a steering shaft of a steering wheel of the motor vehicle, and the yaw rate sensor and the center of mass slip angle sensor are arranged on the center of mass of the motor vehicle.

A constant $K_1$ representing an identification gain, a constant Γ representing an online learning gain, time constants $\tau_r$ and $\tau_\beta$, a vehicle mass m, a distance $l_f$ from the center of mass to a front axle, a distance $l_r$ from the center of mass to a rear axle, and a constant $K_2$ representing a control gain are stored in the vehicle ECU.

A front wheel cornering stiffness $C_f$, a rear wheel cornering stiffness $C_r$, the vehicle mass m, the distance $l_f$ from the center of mass to the front axle, and the distance $l_r$ from the center of mass to the rear axle are determined by the motor vehicle manufacture and are stored in the vehicle ECU. $I_Z$ is a vertical rotational inertia of the motor vehicle, determined and stored by the vehicle manufacturer in the vehicle ECU.

The method includes a first step: constructing fundamental formulas stored in the vehicle ECU, including Formulas 1 to 15.

In each formula, $x=[\beta, \gamma]^T \in R^2$ is a 2-dimensional column vector in a real number field R; β is the center of mass slip angle in rad; γ is the yaw rate in rad/s; $a \in R^{2 \times 2}$ is a 2-by-2 matrix in the real number field R; $\omega \in R^{2 \times 2}$ is a 2-by-2 matrix in the real number field R; σ(x) is a sigmoidal excitation function in a neural network, and $\sigma(x)=[\sigma(x_1), \sigma(x_2)]^T$; $\lambda \in R^{2 \times 2}$ is a 2-by-2 matrix in the real number field R; $u=[\delta_c, M_c]^T \in R^2$ is a 2-dimensional column vector in the real number field R; $\delta_C$ is the active steering angle in rad; $M_c$ is the yaw moment in N·m (i.e., Newton*meter); $\theta=[a, w, \lambda]^T$, $\psi=[x, \sigma(x), u]^T$; $e_1 = x - \hat{x}$ represents an identification error; $\hat{x}$ is an identification state; $\hat{\theta}=[\hat{a}, \hat{w}, \hat{\lambda}]^T$ is an identification parameter; $K_1$ is a constant obtained by trial and error and stored in the vehicle ECU to represent the identification gain, and $K_1 > 0$; Γ is a constant obtained by trial and error and stored in the vehicle ECU to represent the online learning gain, and Γ>0; $\beta_r$ is a target center of mass slip angle, $\gamma_r$ is a target yaw rate, m is the vehicle mass, $l_f$ is the distance from the center of mass to the front axle, $l_r$ is the distance from the center of mass to the rear axle, $v_x$ is the vehicle speed obtained by the vehicle speed sensor, $C_f$ is the front wheel cornering stiffness, $C_r$ is the rear wheel cornering stiffness; $x_r$ is a reference state, $K_2$ is a constant obtained by trial and error and stored in the vehicle ECU to represent the control gain; $Q \in R^{2 \times 2}$ is a 2-by-2 diagonal matrix in the real number field R and represents a weight of a tracking error $e_2$ in Formula 8; $P \in R^{2 \times 2}$ is a 2-by-2 diagonal matrix in the real number field R and represents a weight of $u_2$ in Formula 8; P and Q are obtained by trial and error and stored in the vehicle ECU; V is an evaluation function; $W_V$ is an ideal weight vector; $\sigma(e_2)$ is a sigmoidal excitation function in the neural network, $I_z$ is the vertical rotational inertia of the motor vehicle in kg·m2.

The first step includes a first sub-step of constructing Formula 1 and Formula 2. Formula 1 is a parameterized neural network: $\dot{x} = -ax + \omega\sigma(x) + \lambda u$; wherein $x = [\beta, \gamma]^T \in R^2$ is a 2-dimensional column vector in the real number field R, $\beta$ is the center of mass slip angle, $\gamma$ is the yaw rate, $a \in R^{2 \times 2}$ is a 2-by-2 matrix in the real number field R, $\omega \in R^{2 \times 2}$ is a 2-by-2 matrix in the real number field R, $\sigma(x)$ is the sigmoidal activation function in the neural network, and $\sigma(x) = [\sigma(x_1), \sigma(x_2)]^T$; $\lambda \in R^{2 \times 2}$ is a 2-by-2 matrix in the real number field R, $u = [\delta_c, M_c]^T \in R^2$ is a 2-dimensional column vector in the real number field R; $\delta_c$ is the active steering angle, $M_c$ is the yaw moment; and $\delta_c$ and $M_c$ are final calculation results used to control the motor vehicle.

Formula 2 is obtained by rewriting Formula 1: $\dot{x} = \theta^T \psi$, wherein $\theta = [a, w, \lambda]^T$, $\psi = [x, \sigma(x), u]^T$.

The first step includes a second sub-step of designing an identifier and an online self-learning rate, and constructing Formula 3 and Formula 4.

Formula 3 is the identifier used to implement a system identification: $\dot{\hat{x}} = \hat{\theta}^T \psi + K_1 e_1$; wherein $e_1 = x - \hat{x}$ represents the identification error, $\hat{x}$ represents the identification state, $\hat{\theta} = [\hat{a}, \hat{w}, \hat{\lambda}]^T$ represents the identification parameter, $K_1 > 0$ is a constant obtained by trial and error and stored in the vehicle ECU, representing the identification gain; $\hat{\theta}$ is an identification result of Formula 3 and is provided to Formula 7.

Formula 4 is the online self-learning rate: $\dot{\hat{\theta}} = \Gamma \psi e_1$; wherein $\Gamma$ is a constant obtained by trial and error and is stored in the vehicle ECU, $\Gamma > 0$, and $\Gamma$ represents the online learning gain.

The first step includes a third sub-step of constructing a control target reference model expressed by Formula 5 to generate a target tracking signal.

Formula 5 is: $\dot{x}_r = A_r x_r + E_r \delta_f$; wherein $x_r$ is the reference state, and $x_r = [\beta_r, \gamma_r]^T$, $\beta_r$ is the target center of mass slip angle, $\gamma_r$ is the target yaw rate, and $\beta_r$ and $\gamma_r$ are calculation results of Formula 5 and serve as the target tracking signals;

$$A_r = \begin{bmatrix} -\frac{1}{\tau_\beta} & 0 \\ 0 & -\frac{1}{\tau_r} \end{bmatrix},$$

wherein:

$$\tau_\beta = \frac{a_{12}a_{21} - a_{11}a_{22}}{a_{12}(a_{21}f_1 - a_{11}f_2)}, \tau_r = \frac{a_{12}a_{21} - a_{11}a_{22}}{a_{22}(a_{21}f_1 - a_{11}f_2)} \cdot k_\gamma,$$

$$k_\gamma = \frac{a_{21}f_1 - a_{11}f_2}{a_{11}a_{22} - a_{12}a_{21}} \quad a_{11} = \frac{C_f + C_r}{mv_x},$$

-continued $$a_{12} = \frac{C_f l_f - C_r l_r}{mv_x^2} - 1, a_{21} = \frac{C_f l_f - C_r l_r}{I_z},$$

$$a_{22} = \frac{C_f l_f^2 + C_r l_r^2}{I_z v_x}, f_1 = -\frac{C_f}{mv_x}, f_2 = -\frac{C_f l_f}{I_z};$$

$I_z$ is a vertical rotational inertia of the motor vehicle in kg·m², which is determined by the vehicle manufacturer and stored in the vehicle ECU;

$$E_r = \begin{bmatrix} \dfrac{1 - \dfrac{ml_f}{2(l_f + l_r)l_r c_r} v_x^2}{1 + \dfrac{m}{(l_f + l_r)}\left(\dfrac{l_f}{2c_r} - \dfrac{l_r}{2c_f}\right)v_x^2} \times \dfrac{l_r}{(l_f + l_r)} \\ \dfrac{\dfrac{v_x}{l_f + l_r}}{1 + \dfrac{m}{(l_f + l_r)}\left(\dfrac{l_f}{2c_r} - \dfrac{l_r}{2c_f}\right)v_x^2} \end{bmatrix}$$

m is the vehicle mass in kg; $l_f$ is the distance from the center of mass to the front axle in meters; $l_r$ it is the distance from the center of mass to the rear axle in meters, $v_x$ is the vehicle speed obtained by the vehicle speed sensor in m/s; $C_f$ is a front wheel cornering stiffness in N/rad; and $C_r$ is a rear wheel cornering stiffness in N/rad.

The first step includes a fourth sub-step of constructing a controller expressed by Formula 6 based on an approximate dynamic programming theory to achieve a self-learning collaborative control for active steering and yaw moment.

Formula 6 is the controller: $u = u_1 + u_2$; wherein $u_1$ is configured to ensure that a controlled steady-state error converges to zero, and $u_1$ is expressed by Formula 7: $u_1 = \lambda^\oplus [(\dot{x} - ax - w\sigma(x)) - K_2 e_2]$; wherein $\lambda^\oplus$ represents a generalized inverse of $\lambda$, $$e_2 = x - x_r = \begin{bmatrix} \beta - \beta_r \\ \gamma - \gamma_r \end{bmatrix} = \begin{bmatrix} e_\beta \\ e_\gamma \end{bmatrix}$$

represents the tracking error, and $x_r$ is obtained from Formula 5;

$K_2$ is obtained by trial and error and is stored as the constant representing the control gain in the vehicle ECU, and $K_2 > 0$.

Formula 6 is configured to ensure an optimal control performance based on the approximate dynamic programming theory, and is obtained through Formulas 8 to 15.

Formula 8 is an evaluation function V:

$$V(e_2) = \min_{u_2} \int_0^\infty \left[ e_2^T(\tau) Q e_2(\tau) + u_2^T(\tau) P u_2(\tau) \right] d\tau;$$

wherein $Q \in R^{2 \times 2}$ is a 2-by-2 diagonal matrix in the real number field R representing a weight for optimizing and controlling the tracking error $e_2$ in the evaluation function, which is obtained through trial and error.obtained and is stored in the vehicle ECU; $P \in R^{2 \times 2}$ is a 2-by-2 diagonal matrix in the real number field R representing a weight for optimizing and controlling $u_2$ in the evaluation function, which is obtained through trial and error and is stored in the vehicle ECU.

Formula 9 is a Hamiltonian function: $H(e_2, u_2, \nabla V(e_2)) = (\nabla V(e_2))^T(-K_2 e_2 + \hat{\lambda} u_2) + e_2^T Q e_2 + u_2^T P u_2$; wherein $$\nabla V(e_2) = \frac{\partial V(e_2)}{e_2}$$

represents a partial derivative of V with respect to $e_2$. Since an optimal evaluation function V is unknown, the optimal evaluation function V needs to be approximated with the neural network in Formula 10.

Formula 10 is: $V(e_2) = W_v^T \sigma(e_2)$; wherein $W_v$ is an ideal weight vector, and $\sigma(e_2)$ is the sigmoidal activation function in the neural network.

Formula 11 is derived from Formula 10:

$$\nabla V(e_2) = \frac{\partial V(e_2)}{e_2} = (\nabla \sigma(e_2))^T W_V + \nabla \varepsilon.$$

A Hamiltonian function, that is, Formula 12 is obtained by substituting Formula 11 into Formula 9: $H(e_2, u_2, \nabla V(e_2)) = W_V^T \nabla \sigma(e_2)(-K_2 e_2 + \hat{\lambda} u_2) + e_2^T Q e_2 + u_2^T P u_2$.

Formula 13 is obtained by making the left side of Formula (12) equal to zero: $M = W_V^T N$; wherein $M = -e_2^T Q e_2 - u_2^T P u_2$, $N = \nabla \sigma(e_2)(-K_2 e_2 + \hat{\lambda} u_2)$.

Formula 14 is obtained through a principle of least squares method: $W_v = (N^T N)^{-1} N^T M$.

Formula 15 is obtained by solving Formula (12): $u_2 = -\frac{1}{2} P^{-1} \hat{\lambda}^T (\nabla \sigma(e_2))^T W_V$.

The method further includes a second step: during the driving process of the motor vehicle, calculating the values of the active steering angle $\delta_C$ and yaw moment $M_c$ online by the vehicle ECU according to the following sub-steps, and controlling an operating state of the motor vehicle according to the calculation results of $\delta_C$ and $M_c$.

The second step includes a first sub-step of collecting raw real-time parameter values, including a value of the steering angle $\delta_f$ measured by the steering angle sensor when the driver is steering the wheel, a value of the vehicle speed $v_x$ from the vehicle speed sensor, a value of the center of mass slip angle $\beta$ from the center of mass slip angle sensor, and a value of the yaw rate $\gamma$ from the yaw rate sensor.

The second step includes a second sub-step of performing calculation by the identifier and the control target reference model, including:
providing the value of the center of mass slip angle $\beta$ and the value of the yaw rate $\gamma$ to the identifier expressed by Formula 3 by the vehicle ECU, and performing a calculation to obtain $\hat{\theta}$ as a basis for calculating a value of $u_1$ in Formula 6;
providing $\hat{\theta}$ to Formula 7 to calculate the value of $u_1$ required by Formula 6; and
providing the value of the steering angle $\delta_f$ and the value of the vehicle speed $v_x$ to the control target reference model expressed by Formula 5 by the vehicle ECU, and performing a calculation to obtain a value of the target center of mass slip angle $\beta_r$ and a value of the target yaw rate $\gamma_r$ as basis for calculating $e_2$ required for $u_1$ and $u_2$ in Formula 6.

The second step includes a third sub-step of providing $\beta_r$, $\gamma_r$ and $\hat{\theta}$ to the controller expressed by Formula 6 by the vehicle ECU, and performing a calculation to obtain the active steering angle $\delta_C$ and the yaw moment $M_c$ through Formulas 6 to 15;

controlling, by the vehicle ECU, a rotation of a steering wheel of the motor vehicle according to the active steering angle $\delta_C$ obtained in real time, and controlling a braking action of a baker of the motor vehicle according to the yaw moment obtained in real time;
repeating the second step to achieve an online model-free self-learning collaborative control for active steering and yaw moment.

Figure 2:
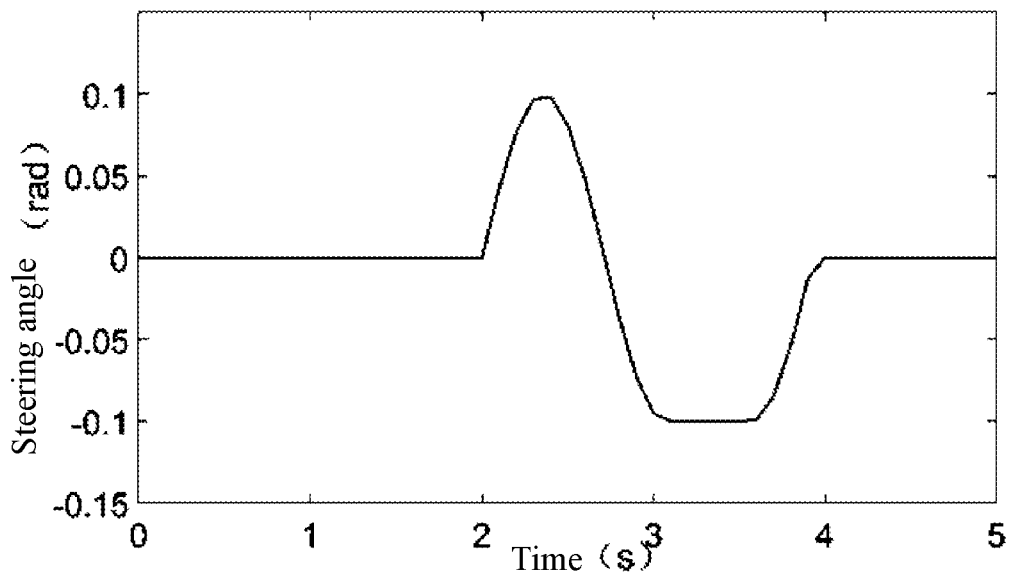
FIG. 2 is a measured steering angle-time curve diagram in a lane change process of a motor vehicle controlled by a vehicle ECU based on an active steering angle $\delta_C$ and a yaw moment $M_c$ at a vehicle speed of 28 m/s.
Figure 3:
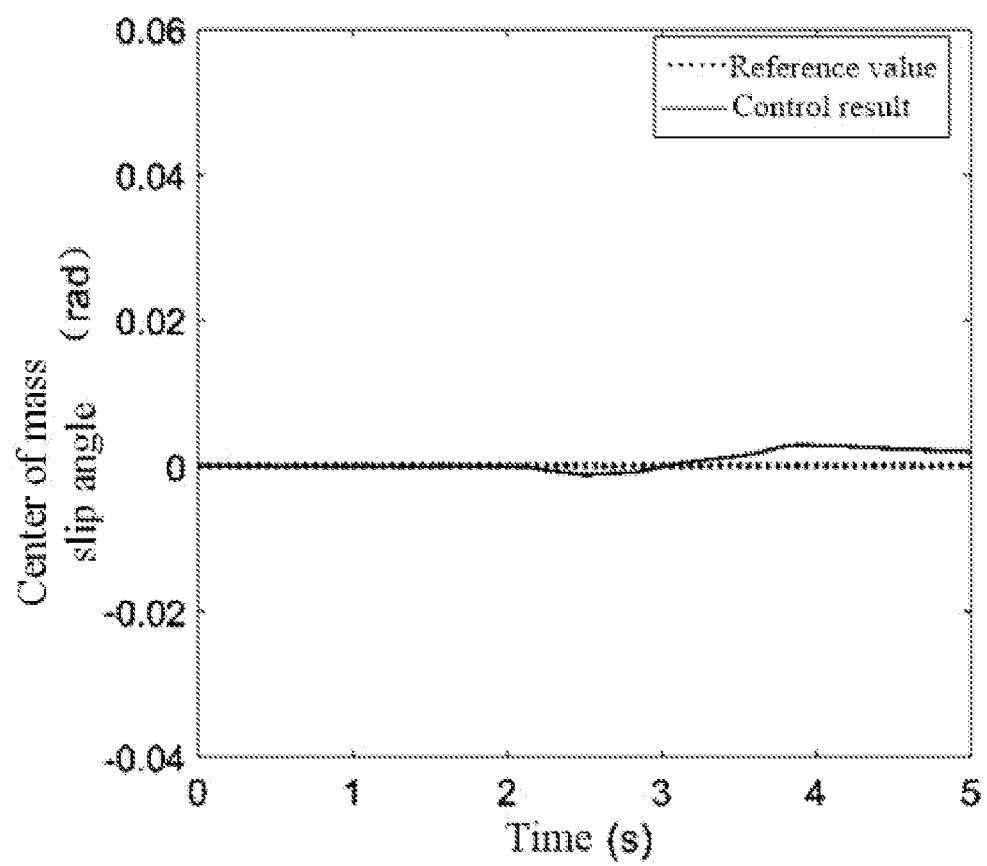
FIG. 3 is a comparison diagram of a reference value of a center of mass slip angle (i.e., the value $\beta_r$ calculated by Formula 5) and a measured value of a control result in the lane change process of the motor vehicle in FIG. 2.
Figure 4:
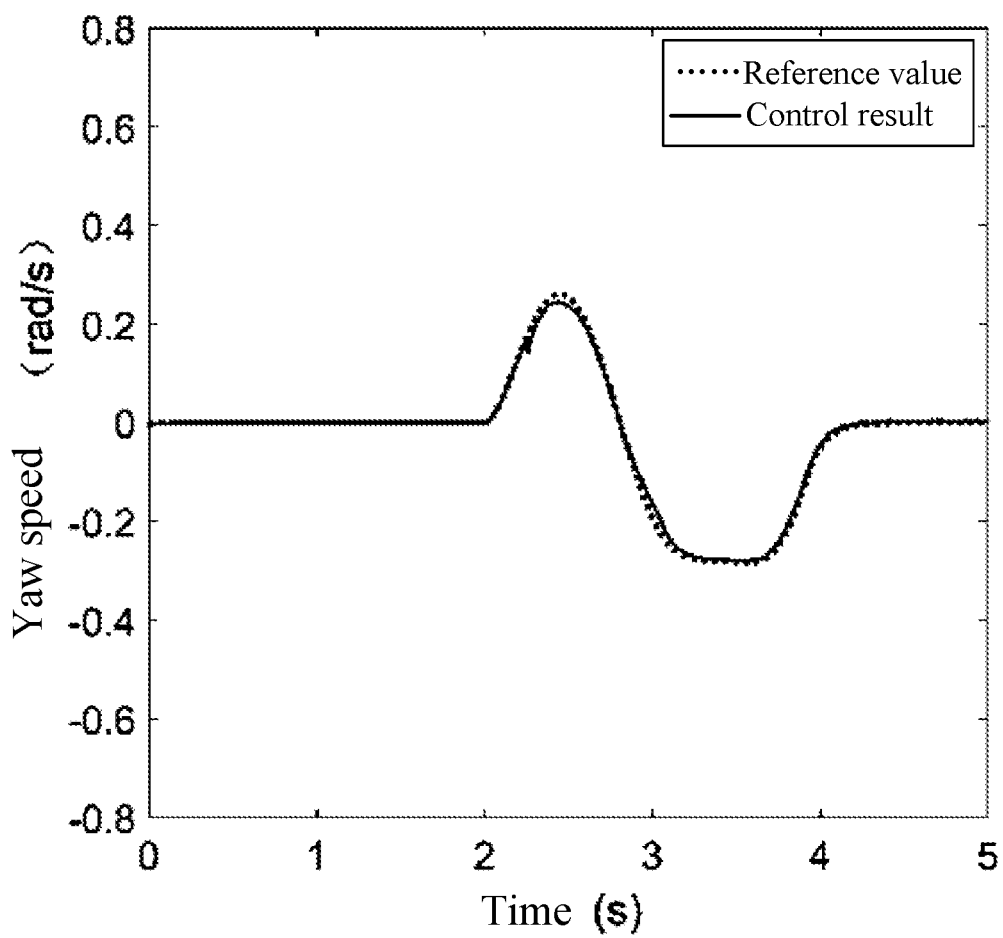
FIG. 4 is a comparison diagram of a reference value of a yaw rate (i.e., the value $\gamma_r$ calculated by Formula 5) and a measured value of the control result in the lane change process of the motor vehicle in FIG. 2.

As shown in FIG. 2 to FIG. 4, the vehicle ECU controls the motor vehicle to change a lane according to the active steering angle $\delta_C$ and the yaw moment $M_c$ at a vehicle speed of 28 m/s. The control results show that the method of the present disclosure can achieve self-learning collaborative control of active steering and yaw moment without requiring model information. The center of mass slip angle and the yaw rate approach the reference values, and the action of changing the lane is smooth and stable, away from rollover risk.

Those skilled in the art may clearly learn about that, specific working processes of the system, device and unit described above may refer to the corresponding processes in the method embodiments and will not be elaborated, herein for convenient and brief description.

When the integrated unit is implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

It is understandable that the above-mentioned technical features may be used in any combination without limitation. The above descriptions are only the embodiments of the present disclosure, which do not limit the scope of the present disclosure. Any equivalent structure or equivalent process transformation made by using the content of the description and drawings of the present disclosure, or directly or indirectly applied to other related technologies in the same way, all fields are included in the scope of patent protection of the present disclosure.

The invention claimed is:

1. A self-learning collaborative control method for active steering and yaw moment for a motor vehicle, the motor vehicle having a vehicle ECU connected to a vehicle speed sensor for acquiring a vehicle speed $v_x$, a steering angle sensor for acquiring a steering angle $\delta_f$ of a driver, a yaw rate sensor for acquiring a yaw rate $\gamma$, and a center of mass slip angle sensor for acquiring a center of mass slip angle $\beta$;
each sensor being conventionally arranged, wherein the steering angle sensor is arranged on a steering shaft of a steering wheel of the motor vehicle, and the yaw rate sensor and the center of mass slip angle sensor are arranged on the center of mass of the motor vehicle;
a constant $K_1$ representing an identification gain, a constant $\Gamma$ representing an online learning gain, time constants $\tau_r$ and $\tau_\beta$, a vehicle mass m, a distance $l_f$ from the center of mass to a front axle, a distance $l_r$ from the center of mass to a rear axle, and a constant $K_2$ representing a control gain being stored in the vehicle ECU; wherein the method comprises:

a first step, constructing fundamental formulas which are stored in the vehicle ECU, comprising an identifier, a control target reference model, and a controller, wherein the fundamental formulas comprises Formulas 1 to 15;

the first step comprises a first sub-step of constructing Formula 1 and Formula 2, and Formula 1 is a parameterized neural network: $\dot{x}=-ax+\omega\sigma(x)+\lambda u$; wherein $x=[\beta, \gamma]^T \in R^2$ is a 2-dimensional column vector in a real number field R, $\beta$ is the center of mass slip angle in rad, $\gamma$ is the yaw rate in rad/s, $a \in R^{2\times 2}$ is a 2-by-2 matrix in the real number field R, $\omega \in R^{2\times 2}$ is a 2-by-2 matrix in the real number field R, $\sigma(x)$ is a sigmoidal activation function in the neural network and $\sigma(x)=[\sigma(x_1), \sigma(x_2)]^T$, $\lambda \in R^{2\times 2}$ is a 2-by-2 matrix in the real number field R, $u=[S_c, M_c]^T \in R^2$ is a 2-dimensional column vector in the real number field R; $\delta_C$ is an active steering angle in rad; $M_c$ is a yaw moment in N·m; and $\delta_C$ and $M_c$ are final calculation results used to control the motor vehicle;

Formula 2 is obtained by rewriting Formula 1: $\dot{x}=\theta^T\psi$, wherein $\theta=[a, w, \lambda]^T$, $\psi=[x,\sigma(x), u]^T$;

the first step comprises a second sub-step of designing the identifier and an online self-learning rate, and constructing Formula 3 and Formula 4;

Formula 3 is the identifier used to implement a system identification: $\dot{\hat{x}}=\hat{\theta}\psi+K_1 e_1$;

wherein $e_1=x-\hat{x}$ represents an identification error, $\hat{x}$ represents an identification state, $\hat{\theta}=[\hat{\alpha},\hat{w},\hat{\lambda}]^T$ represents an identification parameter, $K_1>0$ is a constant obtained by trial and error and stored in the vehicle ECU, representing the identification gain; $\hat{\theta}$ is an identification result of Formula 3 and is provided to Formula 7;

Formula 4 is the online self-learning rate: $\dot{\hat{\theta}}=\Gamma\psi e_1$ wherein $\Gamma$ is a constant obtained by trial and error and is stored in the vehicle ECU, $\Gamma>0$, and $\Gamma$ represents the online learning gain;

the first step comprises a third sub-step of constructing the control target reference model expressed by Formula 5 to generate a target tracking signal;

Formula 5 is: $\dot{x}_r=A_r x_r+E_r\delta_f$; wherein $x_r$ is a reference state, and $x_r=[\beta_r,\gamma_r]^T$, $\beta_r$ is a target center of mass slip angle, $\gamma_r$ is a target yaw rate, and $\beta_r$ and $\gamma_r$ are calculation results of Formula 5 and serve as the target tracking signals;

$$A_r = \begin{bmatrix} -\frac{1}{\tau_\beta} & 0 \\ 0 & -\frac{1}{\tau_r} \end{bmatrix},$$

wherein:

$$\tau_\beta = \frac{a_{12}a_{21}-a_{11}a_{22}}{a_{12}(a_{21}f_1-a_{11}f_2)}, \tau_\gamma = \frac{a_{12}a_{21}-a_{11}a_{22}}{a_{22}(a_{21}f_1-a_{11}f_2)} \cdot k_\gamma,$$

$$k_\gamma = \frac{a_{21}f_1-a_{11}f_2}{a_{11}a_{22}-a_{12}a_{21}}, a_{11} = \frac{C_f+C_r}{mv_x},$$

-continued
$$a_{12} = \frac{C_f l_f - C_r l_r}{mv_x^2} - 1, a_{21} = \frac{C_f l_f - C_r l_r}{I_z},$$

$$a_{22} = \frac{C_f l_f^2 + C_r l_r^2}{I_z v_x}, f_1 = -\frac{C_f}{mv_x}, f_2 = -\frac{C_f l_f}{I_z};$$

$I_Z$ is a vertical rotational inertia of the motor vehicle in kg·m², which is determined by a vehicle manufacturer and stored in the vehicle ECU;

$$E_r = \begin{bmatrix} \frac{1-\frac{ml_f}{2(l_f+l_r)l_r c_r}v_x^2}{1+\frac{m}{(l_f+l_r)}\left(\frac{l_f}{2c_r}-\frac{l_r}{2c_f}\right)v_x^2} \times \frac{l_r}{(l_f+l_r)} \\ \frac{\frac{v_x}{l_f+l_r}}{1+\frac{m}{(l_f+l_r)}\left(\frac{l_f}{2c_r}-\frac{l_r}{2c_f}\right)v_x^2} \end{bmatrix}$$

m is the vehicle mass in kg; $l_f$ is the distance from the center of mass to the front axle in meters; $l_r$ is the distance from the center of mass to the rear axle in meters, $v_x$ is the vehicle speed obtained by the vehicle speed sensor in m/s; $C_f$ is a front wheel cornering stiffness in N/rad; $C_r$ is a rear wheel cornering stiffness in N/rad;

the first step comprises a fourth sub-step of constructing the controller expressed by Formula 6 based on an approximate dynamic programming theory to achieve a self-learning collaborative control for active steering and yaw moment;

Formula 6 is the controller: $u=u_1+u_2$; wherein $u_1$ is configured to ensure that a controlled steady-state error converges to zero, and $u_1$ is expressed by Formula 7: $u_1=\lambda^{\oplus}[(\dot{x}-\alpha x-w\sigma(x)-K_2 e_2]$; wherein $\lambda^{\oplus}$ represents a generalized inverse of $\lambda$, $$e_2 = x - x_r = \begin{bmatrix} \beta-\beta_r \\ \gamma-\gamma_r \end{bmatrix} = \begin{bmatrix} e_\beta \\ e_r \end{bmatrix}$$

represents a tracking error, $x_r$ is obtained from Formula 5, $K_2$ is obtained by trial and error and is stored as the constant representing the control gain in the vehicle ECU, and $K_2>0$;

Formula 6 is configured to ensure an optimal control performance based on the approximate dynamic programming theory, and is obtained through Formulas 8 to 15;

Formula 8 is an evaluation function V:

$$V(e_2) = \min_{u_2} \int_0^\infty \left[e_2^T(\tau)Qe_2(\tau) + u_2^T(\tau)Pu_2(\tau)\right]d\tau;$$

wherein $Q \in R^{2\times 2}$ is a 2-by-2 diagonal matrix in the real number field R representing a weight for optimizing and controlling the tracking error $e_2$ in the evaluation function, which is obtained through trial and error and is stored in the vehicle ECU; $P \in R^{2\times 2}$ is a 2-by-2 diagonal matrix in the real number field R representing a weight for optimizing and controlling $u_2$ in the evaluation function, which is obtained through trial and error and is stored in the vehicle ECU;

Formula 9 is a Hamiltonian function: $H(e_2, u_2, \nabla V(e_2)) = (\nabla V(e_2))^T(-K_2 e_2 + \hat{\lambda} u_2) + e_2^T Q e_2 + u_2^T P u_2$; wherein $$\nabla V(e_2) = \frac{\partial V(e_2)}{e_2}$$

represents a partial derivative of V with respect to $e_2$, and an optimal evaluation function V is approximated with the neural network in Formula 10;
Formula 10 is: $V(e_2) = W_v^T \sigma(e_2)$; wherein $W_v$ is an ideal weight vector, and $\sigma(e_2)$ is the sigmoidal activation function in the neural network;
Formula 11 is derived from Formula 10:

$$\nabla V(e_2) = \frac{\partial V(e_2)}{e_2} = (\nabla \sigma(e_2))^T W_V + \nabla \varepsilon;$$

a Hamiltonian function, that is, Formula 12 is obtained by substituting Formula 11 into Formula 9: $H(e_2, u_2, \nabla V(e_2)) = W_V^T \nabla \sigma(e_2)(-K_2 e_2 + \hat{\lambda} u_2) + e_2^T Q e_2 + u_2^T P u_2$;
Formula 13 is obtained by making a left side of Formula (12) equal to zero: $M = W_V^T N$; wherein $M = -e_2^T Q e_2 - u_2^T P u_2$, and $N = \nabla \sigma(e_2)(-K_2 e_2 + \hat{\lambda} u_2)$;
Formula 14 is obtained through a principle of least squares method: $W_v = (N^T N)^{-1} N^T M$; and
Formula 15 is obtained by solving Formula (12): $u_2 = -\frac{1}{2} P^{-1} \hat{\lambda}^T (\nabla \sigma(e_2))^T W_V$; and
a second step, during a driving process of the motor vehicle, calculating values of the active steering angle $\delta_C$ and the yaw moment $M_c$ online by the vehicle ECU according to the following sub-steps, and controlling an operating state of the motor vehicle according to the calculation results of $\delta_C$ and $M_c$.

2. The method according to claim 1, wherein the second step comprises a first sub-step of collecting raw real-time parameter values, comprising a value of the steering angle $\delta_f$ measured by the steering angle sensor when the driver is steering the wheel, a value of the vehicle speed $v_x$ from the vehicle speed sensor, a value of the center of mass slip angle $\beta$ from the center of mass slip angle sensor, and a value of the yaw rate $\gamma$ from the yaw rate sensor.

3. The method according to claim 2, wherein the second step comprises a second sub-step of performing calculation by the identifier and the control target reference model, comprising:
providing the value of the center of mass slip angle $\beta$ and the value of the yaw rate $\gamma$ to the identifier expressed by Formula 3 by the vehicle ECU, and performing a calculation to obtain $\hat{\theta}$ as a basis for calculating a value of $u_1$ in Formula 6;
providing $\hat{\theta}$ to Formula 7 to calculate the value of $u_1$ required by Formula 6; and
providing the value of the steering angle $\delta_f$ and the value of the vehicle speed $v_x$ to the control target reference model expressed by Formula 5 by the vehicle ECU, and performing a calculation to obtain a value of the target center of mass slip angle $\beta_r$ and a value of the target yaw rate $\gamma_r$ as basis for calculating $e_2$ required for $u_1$ and $u_2$ in Formula 6.

4. The method according to claim 3, wherein the second step comprises a third sub-step of providing $\beta_r$, $\gamma_r$ and $\hat{\theta}$ to the controller expressed by Formula 6 by the vehicle ECU, and performing a calculation to obtain the active steering angle $\delta_C$ and the yaw moment $M_c$ through Formulas 6 to 15;
controlling, by the vehicle ECU, a rotation of a steering wheel of the motor vehicle according to the active steering angle $\delta_C$ obtained in real time, and controlling a braking action of a baker of the motor vehicle according to the yaw moment $M_c$ obtained in real time;
repeating the second step to achieve an online model-free self-learning collaborative control for active steering and yaw moment.

* * * * *